(12) United States Patent
Dussardier et al.

(10) Patent No.: US 11,478,955 B2
(45) Date of Patent: Oct. 25, 2022

(54) ROTOR WITH ANTI-WEAR DEVICE AND MEANS FOR ATTACHING SAME

(71) Applicant: COMPAGNIE GENERALE DES ETABLISSEMENTS MICHELIN, Clermont-Ferrand (FR)

(72) Inventors: Bruno Dussardier, Clermont-Ferrand (FR); Cedric Carlavan, Clermont-Ferrand (FR); Yves Liais, Clermont-Ferrand (FR); Crescence Weber, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 46 days.

(21) Appl. No.: 17/057,947

(22) PCT Filed: May 20, 2019

(86) PCT No.: PCT/FR2019/051143
§ 371 (c)(1),
(2) Date: Nov. 23, 2020

(87) PCT Pub. No.: WO2019/224466
PCT Pub. Date: Nov. 28, 2019

(65) Prior Publication Data
US 2021/0213646 A1 Jul. 15, 2021

(30) Foreign Application Priority Data
May 24, 2018 (FR) ...................................... 1854367

(51) Int. Cl.
*B29B 7/18* (2006.01)
*B29B 7/74* (2006.01)
(Continued)

(52) U.S. Cl.
CPC ............ *B29B 7/186* (2013.01); *B29B 7/7495* (2013.01); *B29B 7/22* (2013.01); *B29C 48/25682* (2019.02)

(58) Field of Classification Search
CPC ......... B29B 7/186; B29B 7/7495; B29B 7/22; B29B 7/14; B29B 7/125; B29B 7/183;
(Continued)

(56) References Cited

U.S. PATENT DOCUMENTS 3,194,385 A * 7/1965 Barnese ................. B65G 33/32
222/413
3,469,824 A * 9/1969 Futty ..................... B01F 27/052
366/64
(Continued)

FOREIGN PATENT DOCUMENTS

CN 201313354 Y 9/2009
CN 201389929 Y 1/2010
(Continued)

OTHER PUBLICATIONS

DE 3943344 C1—Machine Translation Oct. 1990.*
International Search Report dated Aug. 21, 2019, in corresponding PCT/FR2019/051143 (6 pages).

*Primary Examiner* — Charles Cooley
(74) *Attorney, Agent, or Firm* — Venable LLP

(57) ABSTRACT

In the field of mixing rubber mixtures, the invention is directed to a rotor (100) for use in an internal mixer having a mixing vessel in which the rotor rotates, the rotor having one or more blades (104), each blade having a tip (104*a*) with a profile having a predefined curvature; and an anti-wear device detachably fixed to the tip (104*a*) of at least one blade, the anti-wear device including a plate (110) with a profile defined by a lower surface (112) with a curvature complementary to that of the tip 104*a* and an upper surface (114) with a curvature complementary to that of a wall of the
(Continued)

vessel to define, between them, a zone of minimum distance that allows passage of the mixture between the plate (110) and the wall of the vessel. The invention is also directed to an internal mixer having at least one mixing vessel in which the disclosed rotor (100) rotates.

15 Claims, 8 Drawing Sheets

(51) Int. Cl.
    *B29C 48/25*     (2019.01)
    *B29B 7/22*     (2006.01)

(58) Field of Classification Search
    CPC . B29C 48/25682; B29C 48/03; B29C 48/509; B04B 1/2008; B04B 7/12
    USPC .................................................. 366/97, 147
    See application file for complete search history.

(56) References Cited

U.S. PATENT DOCUMENTS

| | | | | |
|---|---|---|---|---|
| 3,485,341 A | * | 12/1969 | Lutz | B65G 33/26 198/664 |
| 3,592,128 A | * | 7/1971 | French | B30B 9/121 100/150 |
| 3,762,537 A | * | 10/1973 | Lutz | E01C 19/48 366/50 |
| 3,841,805 A | | 10/1974 | Zalis | |
| 4,215,942 A | * | 8/1980 | Seufert | B29B 7/429 366/343 |
| 4,398,607 A | * | 8/1983 | Reichardt | B65G 33/265 403/349 |
| 4,775,240 A | | 10/1988 | Passoni | |
| 4,917,501 A | | 4/1990 | Simonet et al. | |
| 5,368,383 A | * | 11/1994 | Peter | B29B 7/186 366/97 |
| 5,429,581 A | * | 7/1995 | Michaud | B04B 1/2008 198/677 |
| 2021/0213646 A1 | * | 7/2021 | Dussardier | B29B 7/14 |

FOREIGN PATENT DOCUMENTS

| | | | |
|---|---|---|---|
| CN | 202528336 U | 11/2012 | |
| CN | 204525822 U | 8/2015 | |
| DE | 3943344 C1 | 10/1990 | |
| EP | 0230333 A2 | 7/1987 | |
| FR | 2632873 A1 | 12/1989 | |
| GB | 2126491 A | * 3/1984 | .......... B01F 7/00025 |

\* cited by examiner

ROTOR WITH ANTI-WEAR DEVICE AND MEANS FOR ATTACHING SAME

TECHNICAL FIELD

The invention relates generally to the production of rubber mixtures and vehicle tires prepared therefrom. More particularly, the invention relates to an anti-wear device for a rotor used in a mixer for a rubber mixture.

BACKGROUND

In the field of elastomer manufacturing, internal mixers are used for mixing raw materials. "Internal mixer" (or "mixer" or "MI") means a machine having a metal ram and two metal half-vessels (or "vessels"), each containing a metal rotor with one or more blades (for example, a Banbury or Intermix type machine for polymers). When the materials in a mixture are mixed, an elastomer in the process of being manufactured is subjected to significant stress. Referring to FIG. 1, this phenomenon is explained with reference to a rotor 10 that is arranged in a vessel 20 and that rotates in the direction of arrow A, the rotor 10 being part of a pair of rotors arranged in parallel so that they can rotate in mutually opposite directions. The rotor 10 has blades 12, and each blade has a tip 12a. As the tip 12a rotates, it will outline a circular path 12b as shown in FIG. 1. A gap $E_{12}$ is defined between the wall 20a of a vessel 20 and the circular path 12b. The raw materials of the rubber mixture, which enter the vessel 20 through an inlet 22, pass through the gap $E_{12}$ between the rotor blades and the wall of each vessel. The raw materials pass the tip 12a where high shear forces are realized that will generate areas of wear.

This phenomenon is present on rotors of the "monobloc" type in an internal mixer where it is noted that the worn zones are always located at the same place of the rotor blades. Referring to FIG. 2, a representative rotor of a monobloc type is represented by the rotor 30 that is arranged in a vessel 50 (the rotor 30 being disclosed by patent FR2632873). The rotor 30 has an axial shaft 32 with an axis of rotation around which the rotor is rotated in the direction of arrow B. An axial shaft 32 has a circumferential surface 32a from which one or more blades 34 extend radially. In a plane perpendicular to the axis of rotation of the rotor 30, a curvature of the profile of the blade 34 is defined by a center of curvature C and a radius of curvature R. This curvature corresponds to a curvature of the vessel wall 50. An edge 34a of the blade 34 defines, together with the vessel wall 50, a gap $E_{30}$ along which the materials of the rubber mixture pass (as described in relation to the gap $E_{12}$ in FIG. 1).

An area of very short length exists along the gap $E_{30}$ where the level of work carried out is very intensive. With the current rubber formulations, which are evolving towards increasingly higher levels of reinforcing fillers (e.g., levels of carbon black and silica), the manufactured elastomers are highly abrasive for the metal surfaces of internal mixers. At the same time, mixing cycles are optimized to ensure maximum productivity.

The wear is not uniform: the rotor itself is eroded, and some more prominent parts of the rotor, such as the blades, are even more eroded. This results in the development of undesirable clearances between the blades and the wall, which have a negative impact on the productivity and quality of the rubber mixture. The consequence of these developments is a problem of premature wear that is found on mixer rotors. The observed wear can be up to several millimeters, while the rest of the metal surfaces of the mixer do not suffer the same level of wear. The service life of some mechanical parts such as rotors is reduced by up to 50%. The downtime for changing these rotors (assembly and disassembly) is long and expensive and requires the complete shutdown of the mixer. The production of semi-finished elastomers cannot be carried out as planned.

Among the recognized solutions for limiting this phenomenon, there is the device disclosed by the publication CN201389929. This device is directed to one or more anti-wear devices fixed to the circumferential surface of a vessel and/or along a surface of a blade of a rotor machined in a single piece. However, each known rotor is characterized by the blade profile (i.e., a flat section, taken perpendicular to the axis of rotation of the rotor, which defines the blade profile as shown in FIG. 1) and by the positioning of the blades on a surface of the rotor. This solution describes only the direct placement of wear protection devices on a rotor machined from a single piece without explaining the potential impacts on its geometry and the corresponding rubber mixing performance.

In addition, contrary to the solution disclosed by the publication CN201389929, the addition of an anti-wear device decreases the cooling efficiency. However, it is particularly important to be able to cool the blade tip, because here the temperature increase is higher than in other areas of the rotor. For this reason, rotors are often equipped with cooling systems in the form of geometrical channels drilled into the interior of the rotor to control the temperature of the mixture during the mixing cycle, this temperature being able to reach approximately 150° C. to 170° C.

In order to preserve the rubber dispersion, the rubber mixing performance and the quality of the rubber mixture, the invention therefore concerns the installation of a removable anti-wear device on the rotor blades in the areas where wear occurs. The anti-wear device includes a plate that is detachably fixed to a rotor adapted to carry out its fixation. When attached to the rotor, the plate provides a means for easy replacement of a worn rotor part without changing the rotor geometry. The rotor therefore includes two parts, including one easily replaceable part, that function as a one-piece rotor at a lower cost.

SUMMARY

The invention is directed to a rotor for use in an internal mixer having a mixing vessel in which the rotor rotates. The rotor includes one or more blades, each blade having a tip whose profile has a predefined curvature. The rotor also includes an anti-wear device detachably fixed to the tip of at least one blade, the anti-wear device having a plate with a profile defined by a lower surface with a curvature complementary to that of the tip and an upper surface with a curvature complementary to that of a wall of the vessel to define, between them, a zone of minimum clearance that allows passage of the mixture between the plate and the wall of the vessel.

In some embodiments, the plate profile is defined by a radius of curvature of the plate that is increasingly progressive in a clockwise direction so that the plate profile resembles a spiral.

In some embodiments, in which the plate includes one or more cooling channels that extend axially along a length of the plate, the cooling channels are arranged along the profile of the plate and connect to supply conduits that carry a corresponding coolant to the plate from a main rotor conduit.

In some embodiments, the rotor also includes a sealing means.

In some embodiments, the sealing means is an O-ring that is placed in a corresponding groove. In some embodiments, the groove is a trapezoidal groove.

In some embodiments, the rotor also includes one or more retaining screws inserted into the plate to engage the rotor.

In some embodiments, the rotor also includes a mechanical fastening system.

In some embodiments, the mechanical fastening system includes a positioning key and one or more worm gear systems. In some embodiments, the positioning key is a parallel key with a top surface that engages a corresponding reinforcement of the lower surface of the plate, the positioning key engaging in a corresponding groove in the top.

In some embodiments, the worm gear system includes a gear wheel, a screwed axial locking element and a screw tangentially inserted into the rotor and axially locked by the screwed axial locking element so that rotation of the screw causes the gear wheel to rotate.

In some embodiments, each retaining screw includes a screw head placed towards the upper surface of the plate.

In some embodiments, the rotor also includes a screw plug with a cylindrical structure having a thread that engages in a corresponding thread in the rotor. In some embodiments, the screw plug includes a clamping element that extends from an outer surface of the cylindrical structure to facilitate tightening of the screw plug relative to the rotor.

In some embodiments, each screw plug is placed towards the upper surface of the plate.

In some embodiments, the rotor includes two blades, and the blades are inclined in opposite directions to each other.

The invention is also directed to an internal mixer having at least one mixing vessel in which the disclosed rotor rotates.

Other aspects of the invention will become evident from the following detailed description.

BRIEF DESCRIPTION OF THE DRAWINGS

The nature and the various advantages of the invention will become more obvious when reading the following detailed description, together with the attached drawings, in which the same reference numbers designate identical parts everywhere, and in which.

DETAILED DESCRIPTION

Figure 1:
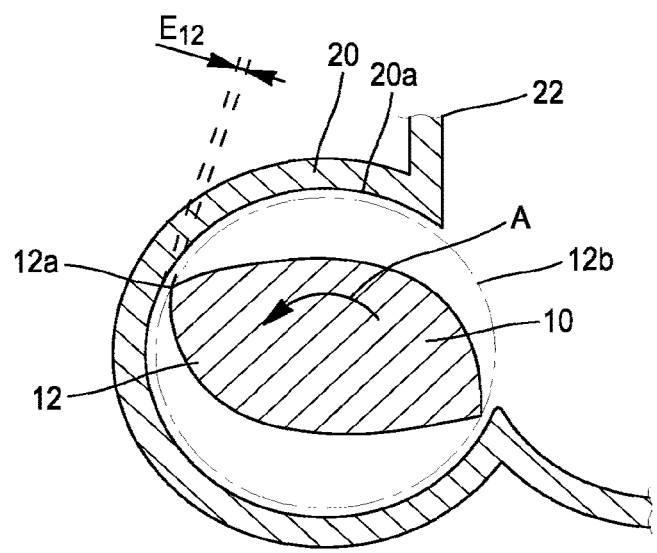
FIG. 1 represents a planar section, taken perpendicular to the axis of rotation of the rotor of a known internal mixer.
Figure 2:
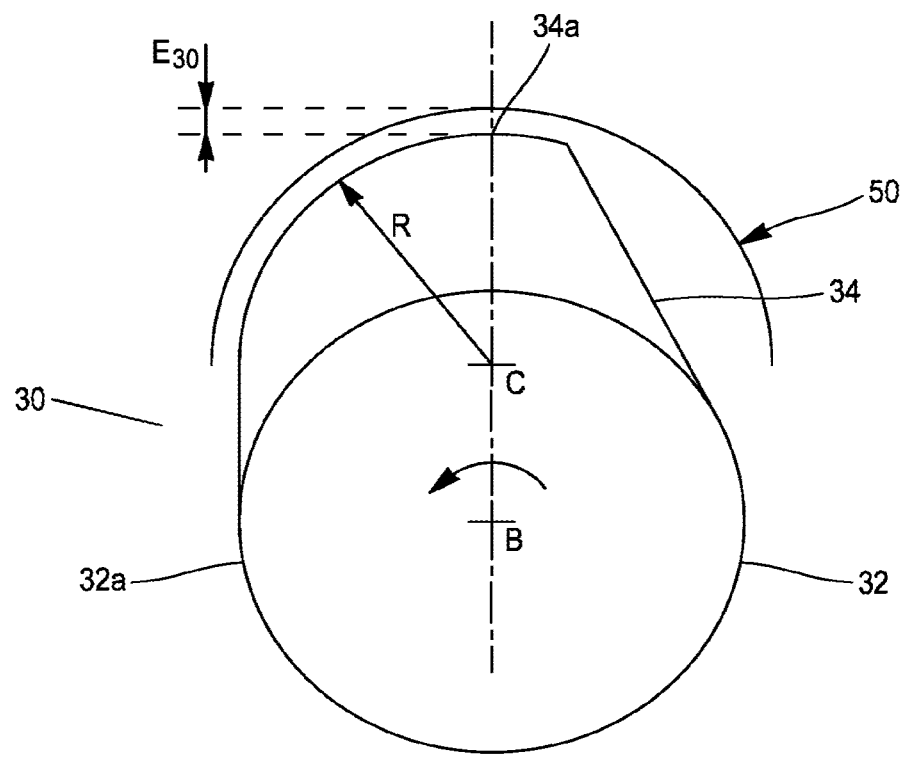
FIG. 2 represents a profile view of a one-piece rotor of the prior art.
Figure 3:
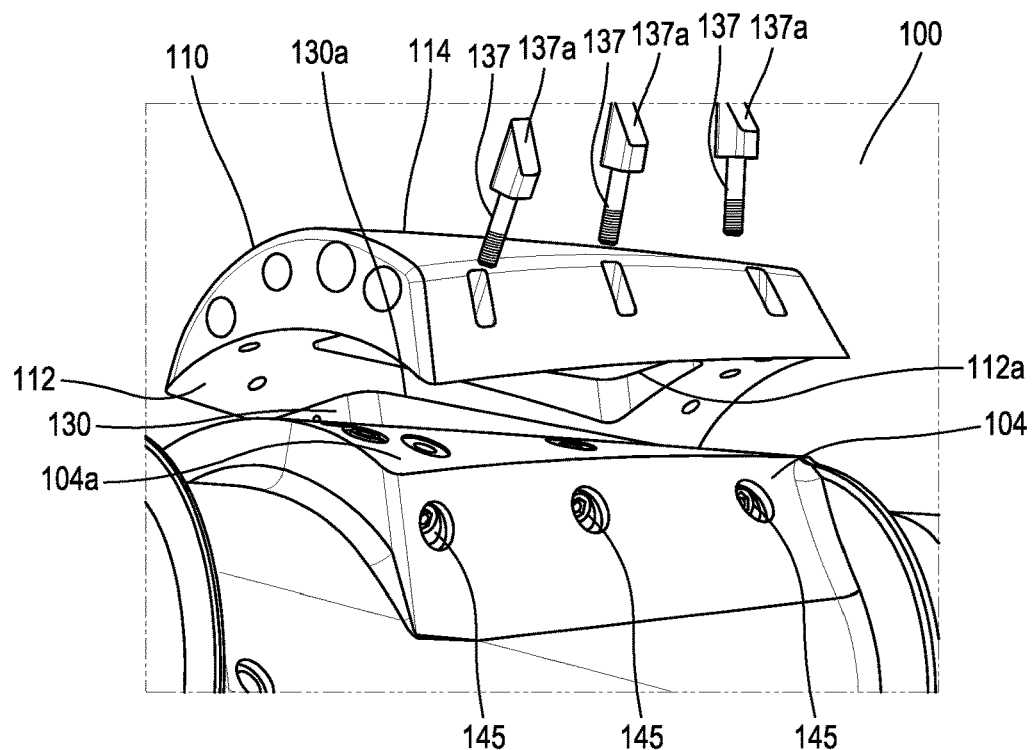
FIG. 3 represents a partial exploded view of a rotor and an anti-wear device of the invention.

Referring now to the figures, in which the same numbers identify identical components, FIG. 3 represents a rotor 100 supplied with an anti-wear device to increase the service life of the rotor and to increase its ability to resist abrasion by the rubber mixture. The rotor 100 is shown as a one-piece rotor as described above, this one with one or more blades 104. It is understood that the rotor may be selected from a configuration known in the art (for example, the rotor may be a tangential rotor, a meshing rotor, or an equivalent rotor). The rotor 100 is made of a metallic material such as steel (normal steel or high-strength steel). It is understood that another metal or equivalent material may be used (for example, stainless steel, titanium, etc.). A known chemical protective coating can be added on any part of rotor 100.

The placement and attachment of the anti-wear device is realized with reference to a tip 104a of the blade 104. The rotor 100 is machined to create a tip 104a of the blade 104 that allows the connection with a plate 110. In a plane perpendicular to the axis of rotation of the rotor 100, a curvature of the profile of the 104a is defined by a center of curvature and a radius of curvature of the rotor.

Figure 4:
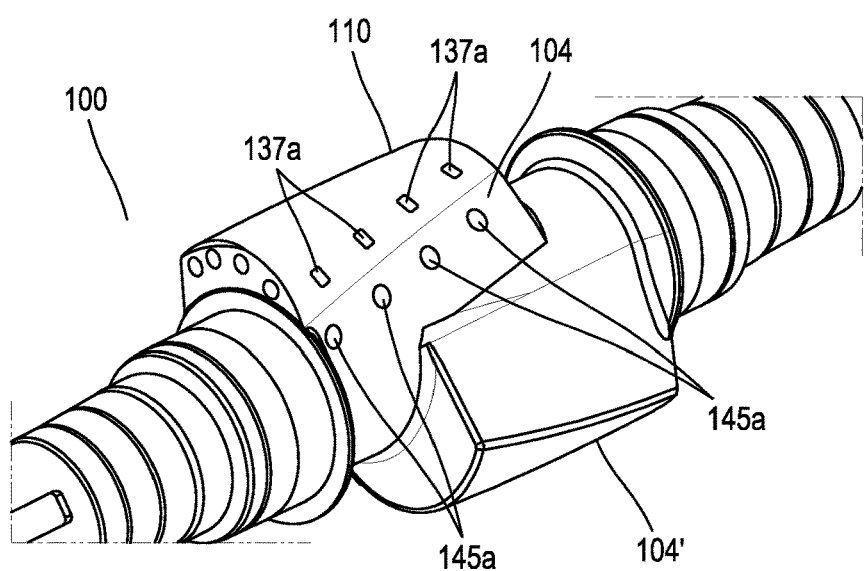
FIG. 4 represents a perspective view of a representative rotor with which the anti-wear device of FIG. 3 is used.
Figure 5:
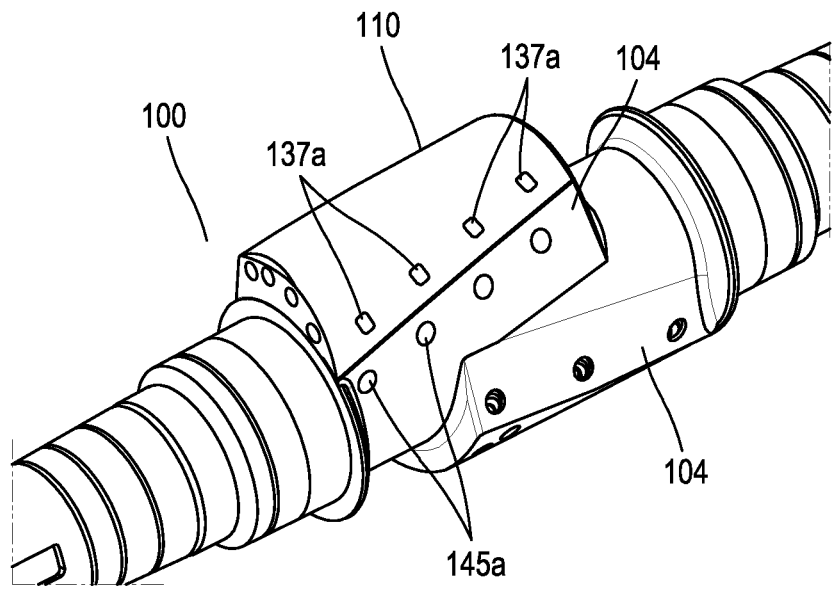
FIG. 5 represents a perspective view of another representative rotor with which the anti-wear device of FIG. 3 is used.
Figure 9:
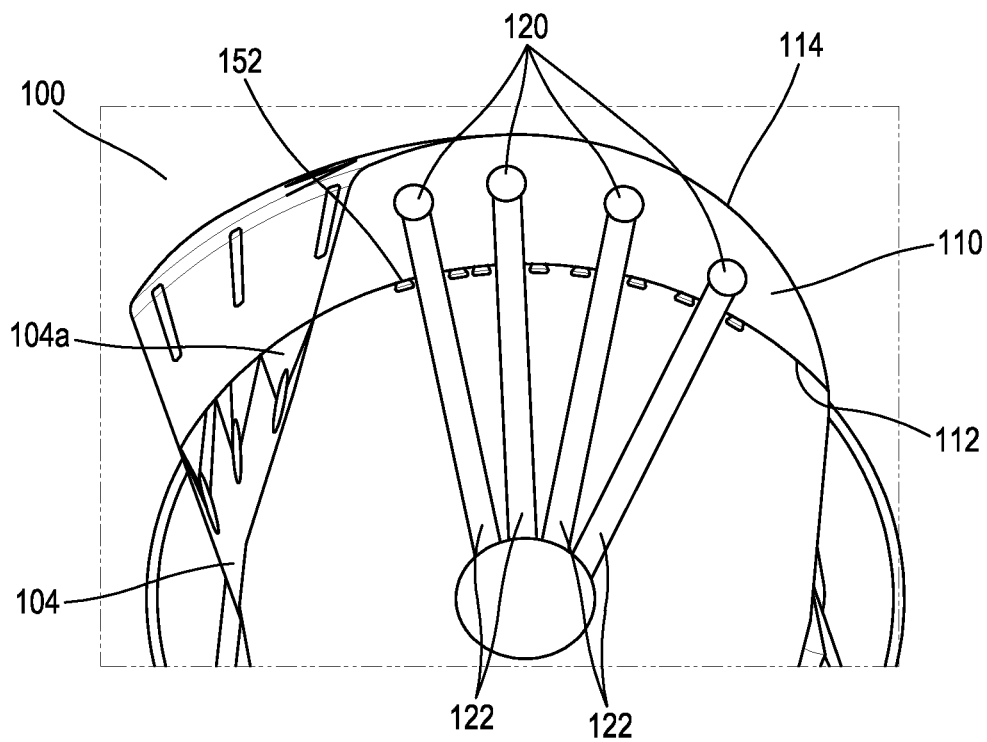
FIG. 9 represents a partial cross-sectional view, of the rotor and the anti-wear device of the invention.

Referring again to FIG. 3 and furthermore to FIGS. 4 and 5, and also to FIG. 9, the anti-wear device includes a plate 110 that is detachably fixed to the rotor 100. A profile of the plate 110 is defined by a lower surface 112 and an upper surface 114 of the plate. The lower surface 112 has a curvature complementary to that of the tip 104a to facilitate direct placement of the plate 110 on the blade 104 (and/or on the blade 104' in some embodiments). In FIG. 9, it is understood that the junction of the surfaces 112 and 104a can be circular, which facilitates the machining of the rotor 100 and the plate 110.

The upper surface 114 has a curvature complementary to that of the vessel wall to define, between them, a zone of minimum distance that allows a passage of the mixture between the plate 110 and the vessel wall. In a plane perpendicular to the axis of rotation of the rotor 100, the profile of the plate 110 is defined by a predefined center of curvature of the plate and a predefined radius of curvature of the plate. In the embodiment shown, the profile of the plate 110 is defined by a radius of curvature that is increasingly progressive in a clockwise direction so that the plate profile resembles a spiral (i.e., the curve formed along the lower surface 112 rotates around a longitudinal axis).

The profile of the plate 110 is therefore complementary to the rotor geometry and the vessel geometry as understood by a skilled person. Referring to FIG. 4, the representative rotor 100 has one machined blade 104 with an anti-wear device attached and a second unmachined blade 104', and both blades have identical profiles. Referring to FIG. 5, the representative rotor 100 has two machined blades 104 with an anti-wear device attached to a first blade. The second blade is machined to ensure immediate attachment of an anti-wear device (not shown) so that both blades have identical profiles. For the two representative rotors 100, a rotor profile resembles the profile of a one-piece rotor.

Referring again to FIGS. 3 to 5 and in addition to FIGS. 6 to 9, the plate 110 has cooling channels 120 that extend axially along a length of the plate 110. The cooling channels 120 are arranged along the profile of the plate 110 (see FIG. 9) and connect to supply conduits 122. The supply conduits 122 deliver a corresponding coolant (such as water or other known coolant) to the plate 110 from a main conduit 124 of the rotor 100 (see FIG. 8). The cooling channels 120, supply conduits 122 and main conduit 124 together form a control circuit within the plate 110 to regulate the temperature of the mixture during a mixing cycle as understood by the skilled person. For the embodiment shown, the plate 110 has four cooling channels 120, but the number of cooling channels can be adapted as needed.

Figure 10:
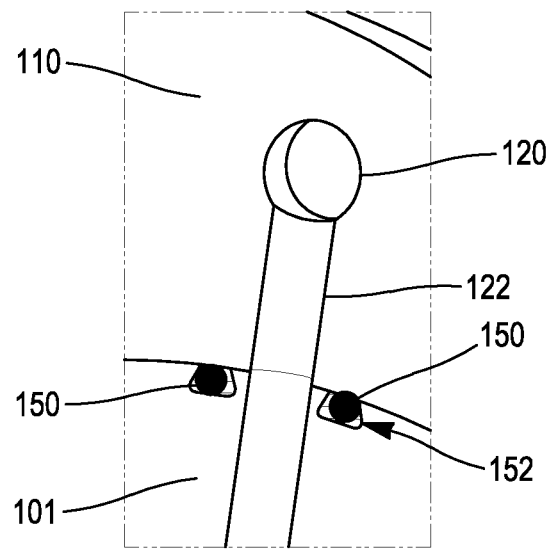
FIG. 10 represents a partial cross-sectional view of an embodiment of the invention that uses a sealing means between the rotor and the anti-wear device.

In some embodiments, the invention is also directed to sealing systems between the plate 110 and the rotor 100. Referring again to FIG. 9 and furthermore to FIG. 10, one embodiment of the invention includes a sealing means having an O-ring 150 that is placed in a groove 152 to effect the sealing with respect to a supply conduit 122. In this embodiment, the groove 152 is a trapezoidal groove in order not to lose the seal during assembly/disassembly of the anti-wear device. It is understood that the O-ring can be replaced by an equivalent seal or by another equivalent sealing means. It is also understood that the groove can be formed with another useful geometry.

Figure 11:
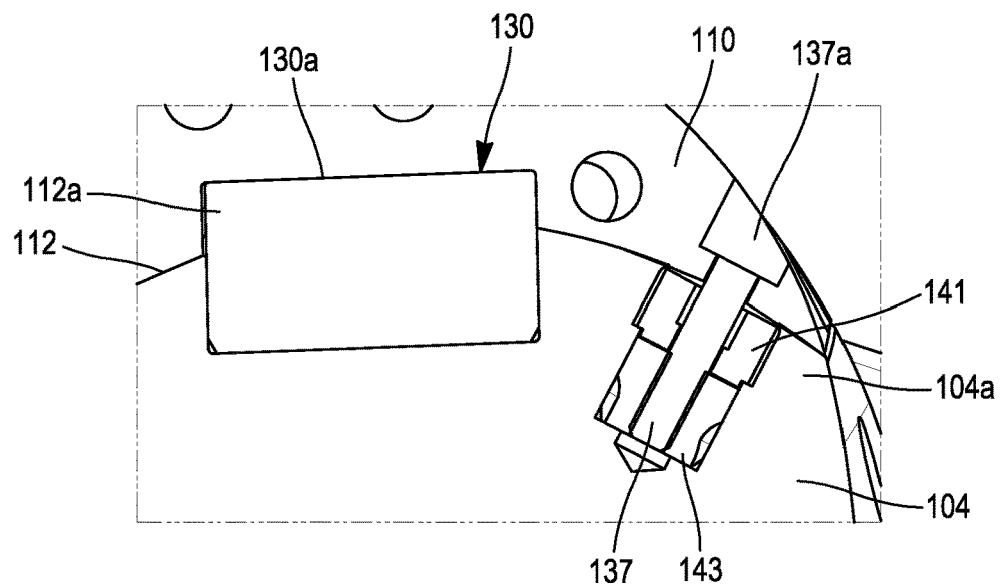
FIG. 11 represents a partial cross-section view of the rotor and the anti-wear device fixed with a mechanical fastening system.
Figure 12:
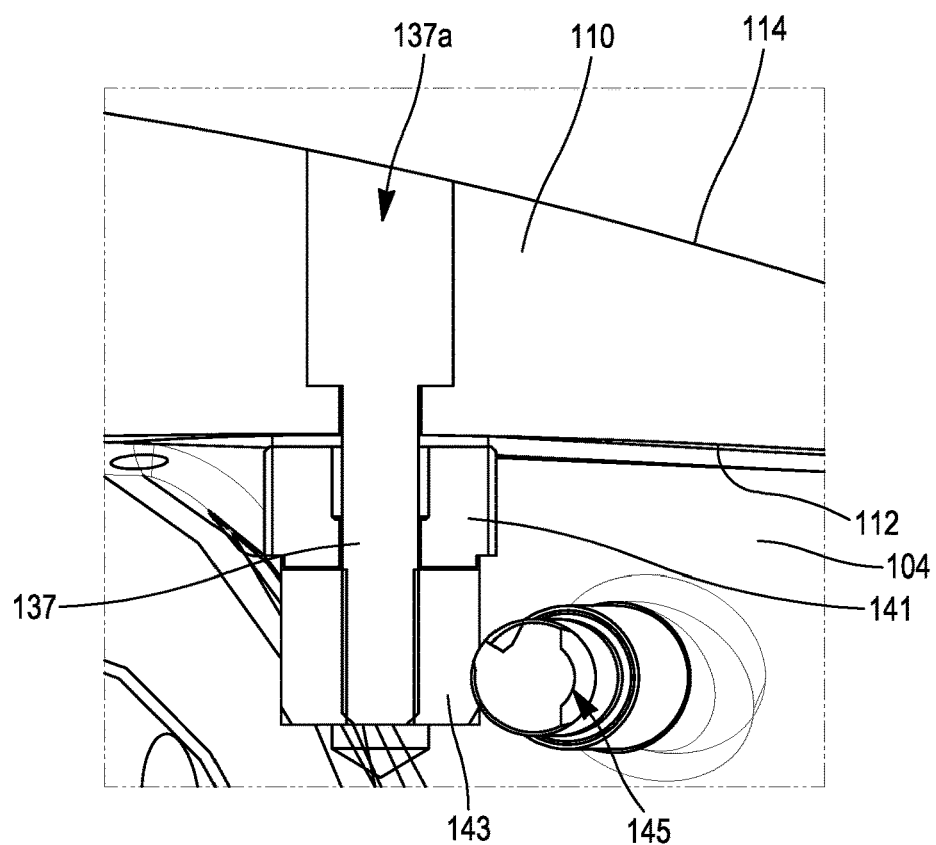
FIG. 12 represents a worm gear system of the mechanical fastening system of FIG. 11.
Figure 13:
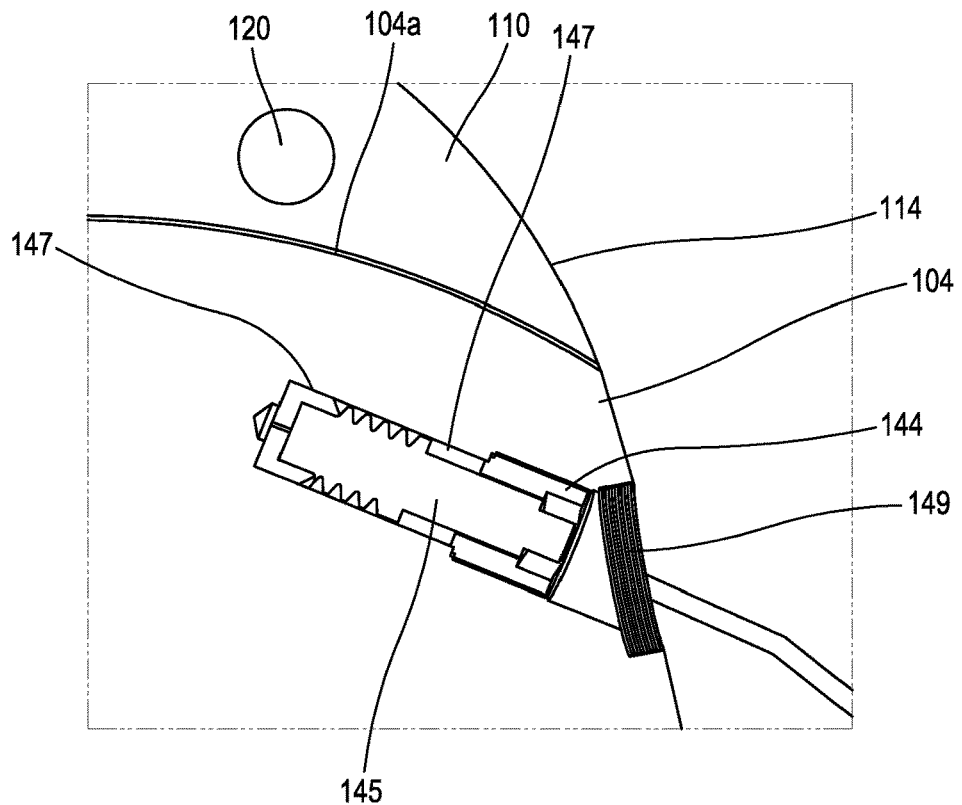
FIG. 13 represents a sectional view of a worm gear of the worm gear system of FIG. 12.

Referring again to FIGS. 3 to 10 and in addition to FIGS. 11 to 13, the plate 110 is detachably fixed to the tip 104a of the blade 104. In order to achieve torque transmission, this fixation is made by a mechanical fastening system including a positioning key (or "key") 130 and one or more worm gear systems. It is understood that other mechanical fastening systems of the screw assembly type may be used.

Figure 6:
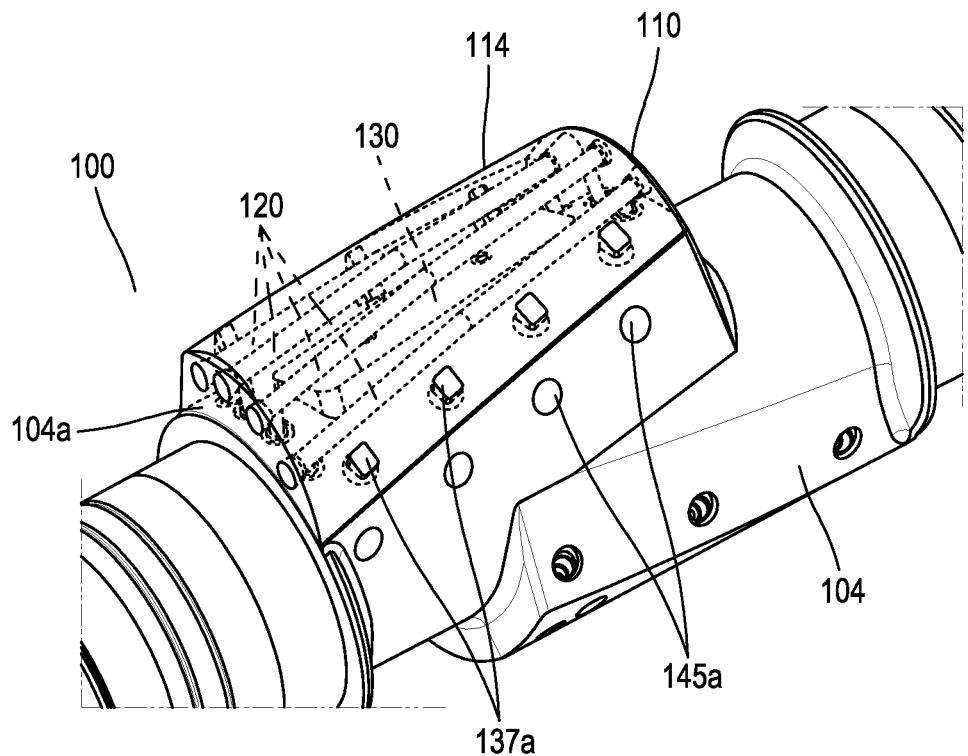
FIG. 6 represents a transparent perspective view.
Figure 7:
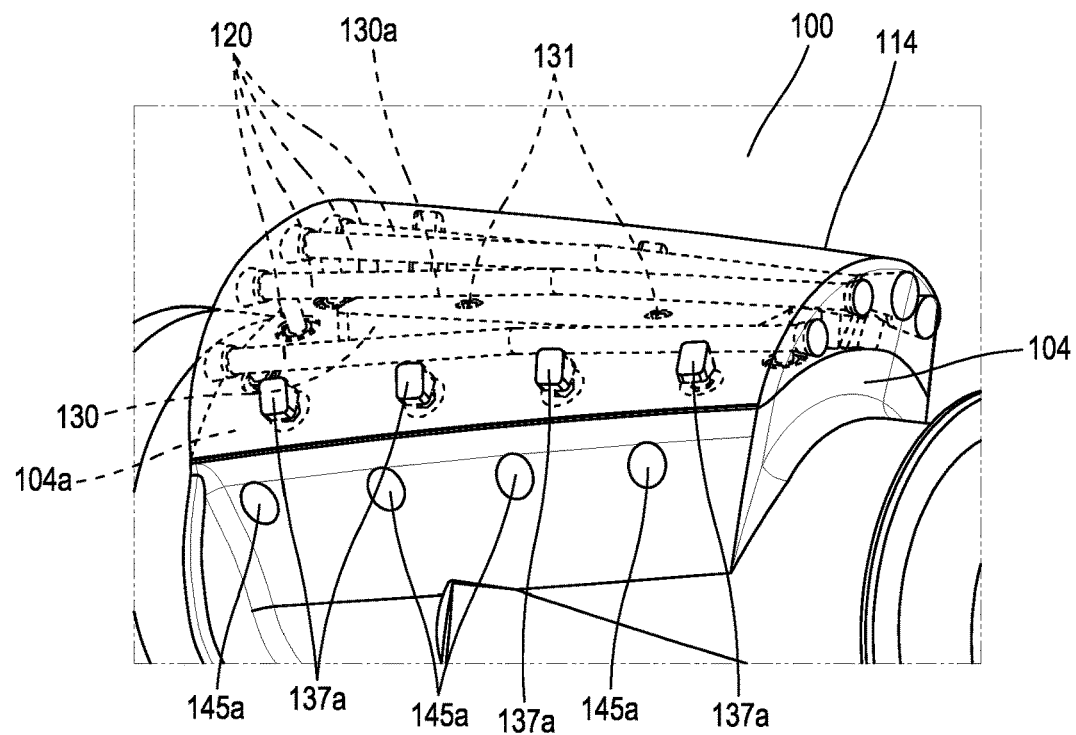
FIG. 7 represents a partial perspective view, of the rotor and the anti-wear device of the invention.
Figure 8:
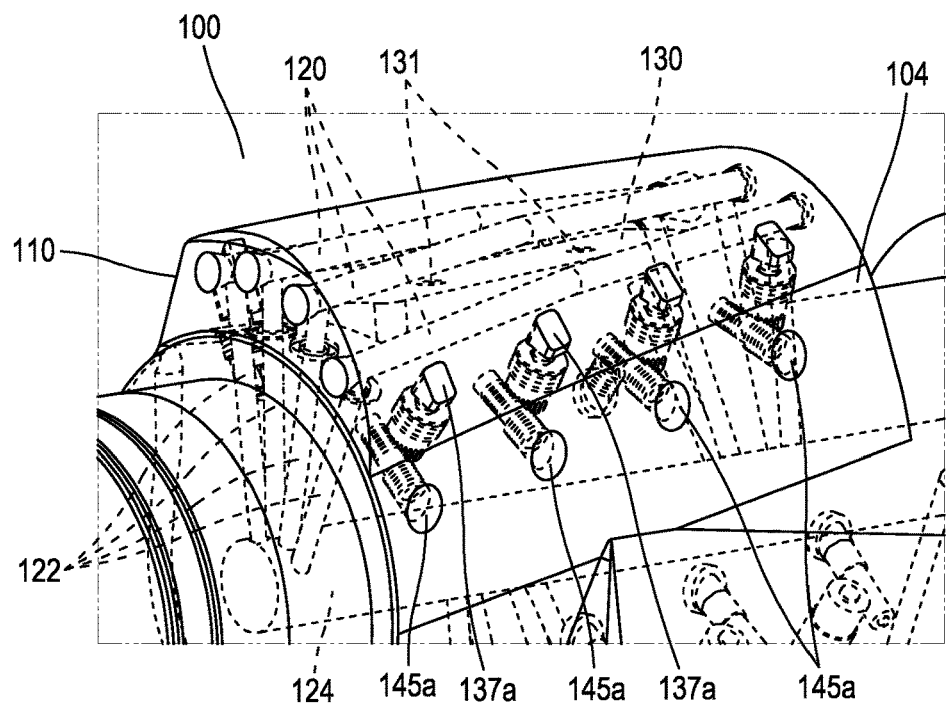
FIG. 8 represents a partial transparent view.

The key 130 is represented by a parallel key with a predetermined total length being fixed at the tip 104a by key screws 131 (see FIGS. 6 and 7). The key 130 engages in a corresponding groove (not shown) in the tip 104a so that an upper surface 130a of the key can engage a corresponding reinforcement 112a of the lower surface 112 of the plate 110. It is understood that the keying can be performed by an equivalent key (e.g., a parallel key of type A, B or C or a disc key).

To detachably fix the plate 110 to the rotor 100, worm gear systems are used to tighten the corresponding retaining screws 137. The retaining screws 137 are inserted into the plate 110 to engage the rotor 100 (e.g., by engaging in a threaded fastener 141 of the rotor 100). Each retaining screw 137 has a screw head 137a that corresponds to the outer shape of the upper surface 114 of the plate 110, avoiding any mixture retention areas (see, for example, FIGS. 6 and 7).

The worm gear system includes a gear wheel 143 (see FIGS. 11 and 12) with a screwed axial locking element 144 and a screw 145 (see FIGS. 12 and 13). The worm gear system may have guide elements 147 as understood by a skilled person. The screw 145 is inserted tangentially into the rotor 100 and is axially locked by the screwed axial locking element 144 so that rotation of the screw 145 causes the gear wheel 143 to rotate. The inside of the gear wheel 143 has an internal thread in which the screw 145 engages. In this configuration, the rotation of the toothed wheel will cause the tightening and loosening of the screw 137, allowing the fixation or release of the plate 110 and therefore its replacement if necessary.

Figure 14:
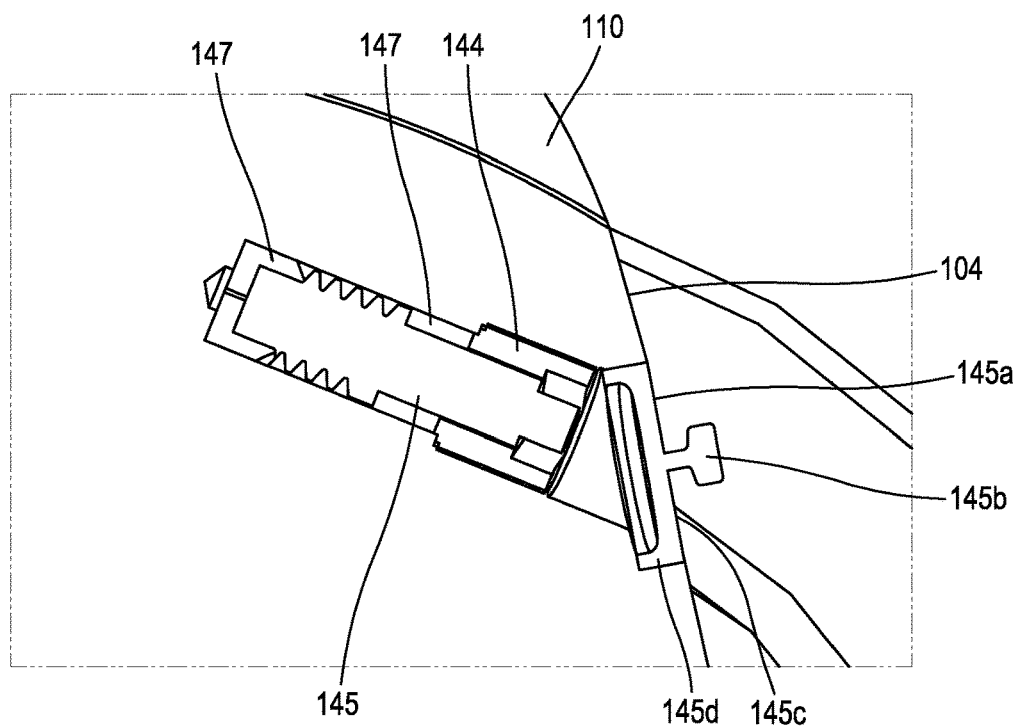
FIGS. 14 and 15 represent an embodiment of the invention with a screw plug.
Figure 15:
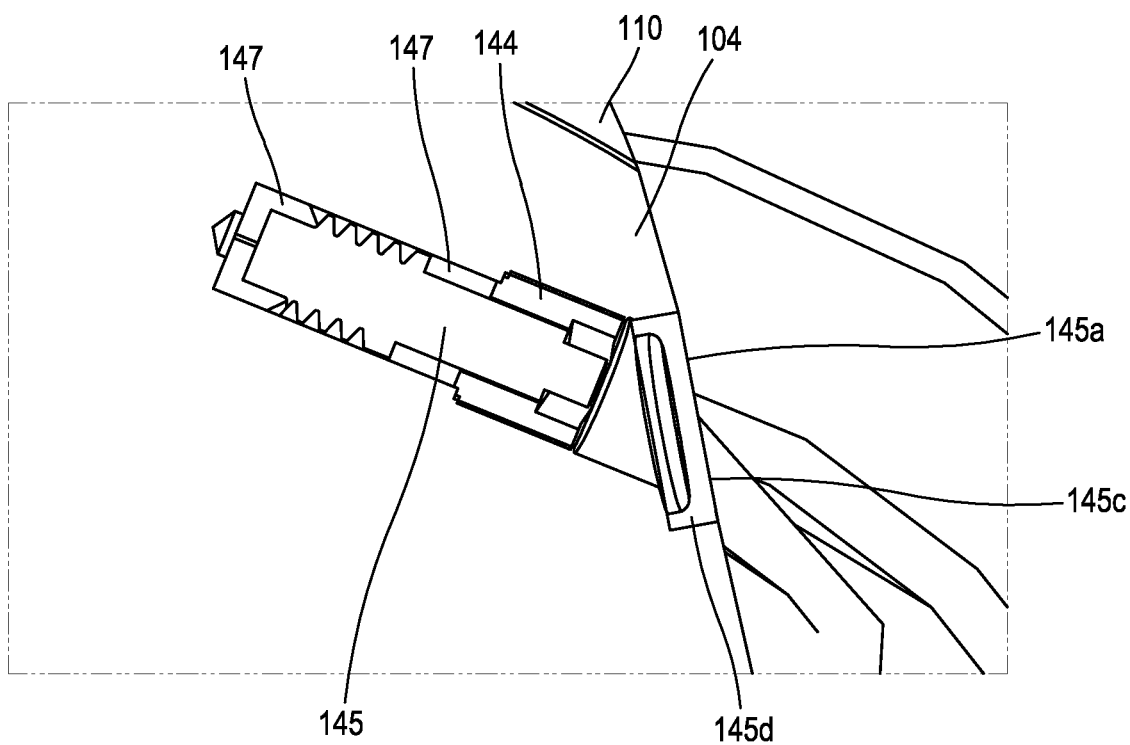

Referring again to FIGS. 14 and 15, in an embodiment of the invention, each screw 145 includes a screw plug 145a that protects the screw (see, for example, FIGS. 6 and 7). The screw plug 145a includes a clamping element 145b that extends from an outer surface 145c of a cylindrical structure 145d (see FIG. 14). The cylindrical structure 145d has a thread that will be screwed into a corresponding thread 149 of the rotor 100 (see FIG. 13). The clamping element 145b can have any geometry to facilitate the tightening of the screw plug 145a (for example, a hexagonal geometry can be chosen). To ensure a smooth surface of the outer surface 145c, the clamping element 145b breaks when the tightening reaches the desired torque (see FIG. 15). When loosening the worm gear assembly, the plug 145a will be destroyed to allow access to the screw 145.

The screw heads 137a and the plug 145a are placed towards the upper surface 114 of the plate 110 according to its profile. The screw heads 137a and the plugs 145a are themselves part of the anti-wear device.

The addition of an anti-wear device such as the plate 110 results in the same geometry as a one-piece rotor. Thus, the effects of the micro-dispersion of additives (provided by the passage between the blade and the vessel wall) and the distribution of components (achieved by the mass transfer of material between the vessels along the rotor 100 in each vessel) are not compromised.

When the plate 110 is worn (either with heads and plugs or without heads and plugs), an in-situ intervention is carried out to change it. In addition, the fact that the worn parts of the rotors can be changed more easily, will allow more frequent changes and thus limit the gap variations between the vessel wall and the rotor. Downtime and associated costs are thus limited while rubber dispersion, rubber mixing performance and rubber mixture quality are preserved.

The wear problem is simply solved with an anti-wear device that is easily machined and customized according to the precise rotor dimensions. The disclosed plate can be applied to newly purchased rotors as well as to already used rotors with a very short re-commissioning time. Replacement rotors that are needed to guarantee industrial production without loss of production can be limited only to the anti-wear devices of the invention. The plates and rotors can be supplied in one or more kits including at least one additional plate with each rotor. The plates are therefore available as needed to reduce the time and investment associated with the expected assembly/disassembly. In addition, the use of rotor tip plates does not change the operating parameters of the rotor.

The addition of some coatings is not possible for the monobloc type rotors or for other known rotor types with a size and weight that prevent the addition of coatings (for example, in vacuum furnaces with limited dimensions). The disclosed invention makes it possible to apply on the anti-wear device coatings that include, for example, without limitation, physical vapor deposition (PVD) (e.g., chromium nitride), chemical vapor deposition (CVD) (e.g., titanium nitride) and their equivalents. Devices already having coatings incorporated therewith can be added in kits to give users more choice.

The terms "at least one" and "one or more" are used interchangeably. Ranges that are presented as "between a and b" include the values "a" and "b".

While specific embodiments of the disclosed device have been illustrated and described, it is understood that various changes, additions and modifications may be made without deviating from the spirit and scope of this disclosure. Consequently, no limitations should be imposed on the scope of the invention described except those set forth in the claims annexed hereto.

The invention claimed is:

1. A rotor for use in an internal mixer having a mixing vessel in which the rotor rotates, the rotor comprising:

one or more blades, each blade having a tip, the profile of which has a predefined curvature; and an anti-wear device detachably fixed to the tip of at least one blade, the anti-wear device comprising a plate with a profile defined by a lower surface with a curvature complementary to the curvature of the tip and an upper surface with a curvature complementary to a curvature of a wall of the vessel to define, between them, a zone of minimum distance that allows a passage of a mixture between the plate and the wall of the vessel, wherein the plate comprises one or more cooling channels that extend axially along a length of the plate, the cooling channels being arranged along the profile of the plate and connecting to supply conduits that convey a corresponding coolant to the plate from a main conduit of the rotor.

2. The rotor of claim 1, wherein the profile of the plate is defined by a radius of curvature of the plate that is increasingly progressive in a clockwise direction so that the profile of the plate resembles a spiral.

3. The rotor of claim 1, further comprising an O-ring that is placed in a corresponding groove of the plate to effect sealing with respect to one of the supply conduits.

4. The rotor of claim 3, wherein the groove is a trapezoidal groove.

5. The rotor of claim 1, further comprising one or more retaining screws inserted into the plate to engage the rotor.

6. The rotor of claim 5, further comprising a mechanical fastening system.

7. The rotor of claim 6, wherein the mechanical fastening system comprises a positioning key and one or more worm gear systems.

8. The rotor of claim 7, wherein the positioning key comprises a parallel key with a top surface that engages a corresponding reinforcement of the lower surface of the plate, the positioning key engaging a corresponding top groove.

9. The rotor of claim 7, wherein the worm gear system comprises a gear wheel, a screwed axial locking member and a screw tangentially inserted into the rotor and axially locked by the screwed axial locking member so that rotation of the screw causes the gear wheel to rotate.

10. The rotor of claim 5, wherein each retaining screw consists of a screw head placed toward the upper surface of the plate.

11. The rotor of claim 10, further comprising a screw plug with a cylindrical structure having a thread that engages a corresponding thread of the rotor.

12. The rotor of claim 11, wherein the screw plug comprises a clamping member extending from an outer surface of the cylindrical structure to facilitate clamping of the screw plug relative to the rotor.

13. The rotor of claim 11, wherein the screw plug is placed toward the upper surface of the plate.

14. The rotor of claim 1, wherein the rotor comprises two blades and the blades are inclined in mutually opposite directions.

15. An internal mixer having at least one mixing vessel in which a rotor of claim 1 rotates.

\* \* \* \* \*